(12) United States Patent
Campbell et al.

(10) Patent No.: US 9,579,580 B1
(45) Date of Patent: Feb. 28, 2017

(54) SIMULATED EYE

(71) Applicants: Joshua Campbell, Allison Park, PA (US); Jason Campbell, Butler, PA (US)

(72) Inventors: Joshua Campbell, Allison Park, PA (US); Jason Campbell, Butler, PA (US)

(*) Notice: Subject to any disclaimer, the term of this patent is extended or adjusted under 35 U.S.C. 154(b) by 33 days.

(21) Appl. No.: 14/106,010

(22) Filed: Dec. 13, 2013

Related U.S. Application Data

(60) Provisional application No. 61/844,112, filed on Jul. 9, 2013.

(51) Int. Cl.
*A63H 3/38* (2006.01)
*A63H 3/42* (2006.01)

(52) U.S. Cl.
CPC .............. *A63H 3/38* (2013.01); *A63H 3/42* (2013.01)

(58) Field of Classification Search
CPC ............... A63H 3/38; A63H 3/40; A63H 3/42
See application file for complete search history.

(56) References Cited

U.S. PATENT DOCUMENTS

| | | | |
|---|---|---|---|
| 2,563,462 A | 8/1951 | Galeski | |
| 2,603,792 A * | 7/1952 | Jardon | A61F 2/141 623/6.64 |
| 2,670,569 A * | 3/1954 | Heina | A63H 3/38 359/896 |
| 2,966,005 A * | 12/1960 | Anderson | A63H 3/38 359/628 |
| 3,480,971 A | 12/1969 | Smith | |
| 3,846,199 A | 11/1974 | Cappelli | |
| 4,629,442 A * | 12/1986 | Samo | A63H 3/38 446/389 |
| 4,637,159 A | 1/1987 | Kulis | |
| 4,705,488 A * | 11/1987 | Bohl, Jr. | A63H 3/445 446/393 |
| 4,875,888 A | 10/1989 | Harvey | |
| 5,037,344 A * | 8/1991 | Secrist | A63H 3/38 446/392 |
| 5,087,204 A | 2/1992 | Thompson | |

(Continued)

OTHER PUBLICATIONS

Tohickon website showing glass eyes, http://www.tohickonglasseyes.com/shop.asp.

(Continued)

*Primary Examiner* — Gene Kim
*Assistant Examiner* — Alyssa Hylinski
(74) *Attorney, Agent, or Firm* — William F. Lang, IV; Lang Patent Law LLC

(57) ABSTRACT

A simulated eye is provided for taxidermy, replica animals made by carving wood, modeling, and other replica animal or replica human construction. The simulated eye provides a more realistic appearance than previous simulated eyes. The eye includes a domed central portion resembling a cornea that is surrounded by a scleral band. The eye is made from one-piece construction using materials that simulate the refractive index of a natural eye. The interior of the eyes are painted to resemble the iris and pupil of a real eye. The configuration of the simulated eye, in conjunction with the refractive index of the material with which it is made, provides a realistic appearance as the angle at which the eye is viewed changes. The eye is structured for easy mounting.

7 Claims, 3 Drawing Sheets

(56) References Cited

U.S. PATENT DOCUMENTS

| | | | | |
|---|---|---|---|---|
| 5,919,227 | A * | 7/1999 | Bello | A61F 2/141 |
| | | | | 446/341 |
| 6,099,379 | A * | 8/2000 | Eppley | A63H 3/38 |
| | | | | 446/389 |
| D458,685 | S * | 6/2002 | Lumsden | D21/661 |
| 6,786,794 | B2 * | 9/2004 | Bae | A63H 3/38 |
| | | | | 446/389 |
| D549,891 | S | 8/2007 | Alfaro | |
| 7,503,827 | B2 | 3/2009 | Alfaro | |
| 8,257,137 | B2 | 9/2012 | Liu | |
| 8,651,916 | B2 * | 2/2014 | Irmler | A63H 3/40 |
| | | | | 446/219 |
| 2003/0017781 | A1 * | 1/2003 | Chang | A63H 3/38 |
| | | | | 446/389 |
| 2004/0097166 | A1 * | 5/2004 | Maddocks | A63H 3/42 |
| | | | | 446/392 |

OTHER PUBLICATIONS

Van Dyke's website showing glass eyes, http://www.vandykestaxidermy.com/Van-Dykes-Eyes-C4372.aspx.

* cited by examiner

SIMULATED EYE

CROSS REFERENCE TO RELATED APPLICATION

This application claims the benefit of U.S. provisional patent application Ser. No. 61/844,112, filed Jul. 9, 2011, and entitled "Simulated Eye."

TECHNICAL FIELD

The present invention relates to simulated eyes. More specifically, a simulated eye is provided with a configuration which, when combined with the refractive index of the material with which it is made, provides a realistic appearance as the angle at which the eye is viewed changes.

BACKGROUND INFORMATION

Simulated eyes are commonly used for taxidermy, simulated animals or humans made by wood carving or modeling, for making toys, and the like. Presently available simulated eyes include glass or polymer molded, one-piece structures which are relatively simple to manufacture, but which are not necessarily realistic or easy to install. As described below, more complex solutions have also been proposed.

An example of a presently available simulated eye for a toy is disclosed in U.S. Pat. No. 8,257,137. The eye includes a translucent dome that has a coloring to simulate the color of an iris. The dome is mounted using a separate mounting ring. A plurality of concentric cylinders surrounding a post are disposed inside the covering. The tip of the post, and the ends of the cylinders, are colored a darker color then the translucent covering, so that when they are in close proximity to the translucent covering, they appear to resemble a pupil. The central post is always in contact with the transparent covering. The concentric cylinders may be raised to a position adjacent to the transparent covering by driving members that expand longitudinally when heated. The heating of the driving members is controlled by a printed circuit board. This simulated eye is more complex than necessary for most taxidermy or toy applications.

U.S. Pat. No. 6,099,379 discloses a taxidermy eye. The eye is made from a thermoplastic material such as polycarbonate or acrylic. Color is applied through two alternative processes. In one alternative, during the injection molding of the eye, a pre-pigmented film made of Mylar, or possibly metal, is included within the mold. The film becomes a part of the eye during the molding process. Alternatively, a pad printing process is used wherein a plate is etched either through laser etching or by bringing the plate contact with a plate with a scored image that has been sprayed with an etching solution. After etching, the etched surface is brought into contact with a liquid ink, which remains in the etched areas and is wiped from the un-etched areas. The plate is then pressed into a silicone rubber pad to transfer the ink onto the pad. The pad is then pressed into the concave surface of the eye, thereby transferring the ink from the pad to the concave surface of the eye. The convex surface can also be pigmented using this process. Another embodiment includes a convex surface with a central, raised portion. An inner member includes an achromatic surface extending about its perimeter, and shaped to correspond to the concave surface of the outer member. The inner member further includes a flat pigmented surface. The pigmented surface is a circular and shaped to resemble the Iris of an animal eye. Coloring is applied to the pigmented surface of the inner member through the pad printing process described above, or through a hot stamping process, or application of a decal.

US 2003/0017781 discloses an eye structure for dolls. The eye includes an outer shell that has a raised projection to project the pupil pattern to imitate a real eye. The inner shell resembles the eye white portion, and includes a central indented space having a pupil pattern affixed therein. The outer shell includes a central projection corresponding to the pupil pattern. The projection section of the outer shell is formed by a tangential line between the surfaces of the outer elliptical section and inner circular section. A one-piece structure that is easily and inexpensively made would be desirable.

U.S. Pat. No. 7,503,827 discloses an artificial glass eye. The eye includes a base component made as a preformed powder pressed glass base. The base represents the visible portion of the sclera of the eye. The base includes an iris recess that accommodates an iris component. The iris component is typically a thin, circular disk made from glass. A pupil component formed as a thin disk of pressed glass is placed above the iris component. A cornea component is initially provided with a concave outer surface and convex inner surface. A pressed vitreous corneal component is used to provide the necessary clarity. To assemble the eye, the cornea component is placed over the base, iris component, and pupil component. As the assembly is heated, the glass softens, and the edges of the cornea are gradually pulled downward, resulting in a light fusing of the components without air trapped in between the components.

U.S. Pat. No. 5,087,204 discloses a taxidermy eye mounting method. The method begins with stuffing moist papier-mâché through the eye-opening of a hollowed out animal head. A slightly flexible, cup shaped eye socket is set in the eye-opening, where it adheres to the papier-mâché. The eye socket is designed to resemble an eyelid and eye membrane of an open eye. After the papier-mâché his dried, an eye is inserted or popped into the eye socket. A method that works with a one piece eye would be desirable.

U.S. Pat. No. 4,875,888 discloses an eye for a doll having a composite eye element and a dome shaped transparent cover. The eye includes a plastic, transparent pupil surrounded by a colored iris made from a similar transparent plastic material. The iris and pupil form a concave outer surface. The Iris and pupil are surrounded by a white portion made from an oval shaped plastic. A transparent cover portion fits over the white portion. The structure is intended to provide the illusion of the pupil of the eye following the movements of an observer when the eye is moved relative to the observer. A one-piece simulated eye would be desirable.

U.S. Pat. No. 4,637,159 discloses an artificial eye. The eye includes a cup shaped member with a first lens portion simulating the cornea, and a circumferential wall. The inner, concave surface of the cup shaped member can be provided with a recessed portion. Coating layers of differing colors may be provided to the inner concave surface, simulating an iris and pupil. A transparent lens is secured within the cup shaped member, behind the first lens portion. A reflecting structure is positioned behind the second lens. Light passing through the first and second lenses is thereby reflected back through these lenses. A closure structure is provided to form the back wall of the artificial eye. A simpler, one-piece eye would be desirable.

U.S. Pat. No. 3,846,199 discloses an artificial eye. The eye includes a sclera shaped base having a centrally located top cavity. A dome may be secured over the top cavity. The cavity holds a stack of prepainted transparent discs. Each of the discs includes a central aperture simulating a pupil. The discs themselves simulate the iris. The space between the discs, as well as the space between the discs and the dome, is filled with a liquid having an index of refraction close to the index of refraction of the plastic from which the artificial eye is made. The refractive index of the eye is approximately 1.49. A simpler, one-piece eye would be desirable.

U.S. Pat. No. 2,603,792 discloses an artificial eye. The artificial eye includes a molded base having a recess to hold the iris portion. The iris portion is made by taking a photograph of the good eye, and duplicating the color portion duplicating the color on the iris portion of the artificial eye. The pupil is formed by a black color. A transparent polymer is then molded over the iris portion to form the cornea. A grinding and polishing step is used to smooth the surface of the artificial eye.

U.S. Pat. No. 2,563,462 discloses an artificial eye. The hollow plastic eye body is formed of molded polyacrylic. The plastic eye bodies may have different horizontal diameters and center thicknesses but substantially the same edge thicknesses, in order that a single mold cylinder can be used to form plastic eye bodies of different sizes, shapes, and dimensions. The center portion of the eye body is thicker than the edge portion, with the thickness tapering from the center to the edge. A colored iris made of the same plastic material as the cover, is embedded into the eye body. A cornea is molded over the top of the iris. A simpler, one-piece eye would be desirable.

U.S. Pat. No. 3,480,971 discloses an artificial eye for use as a replacement for a natural eye. The artificial eye includes a pupil portion that is movable through natural muscle acting through a suction cup.

US design patent 549,891 discloses an artificial fish eye.

Accordingly, there is a need for a simulated eye that duplicates the appearance and refractive characteristics of a natural eye. There is a further need for a simulated eye that is easy and inexpensive to manufacture. There is an additional need for a simulated eye that is easy to install on a taxidermy animal, toy, or the like.

SUMMARY

The above needs are met by a simulated eye. The simulated eye is made from a transparent, one-piece structure forming a cornea portion and a scleral band. The cornea portion has an external surface, an internal surface, and a thickness defined therebetween. The cornea portion further defines a central section and an edge. The thickness of the cornea portion is greatest within the central section and tapers towards the edge.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
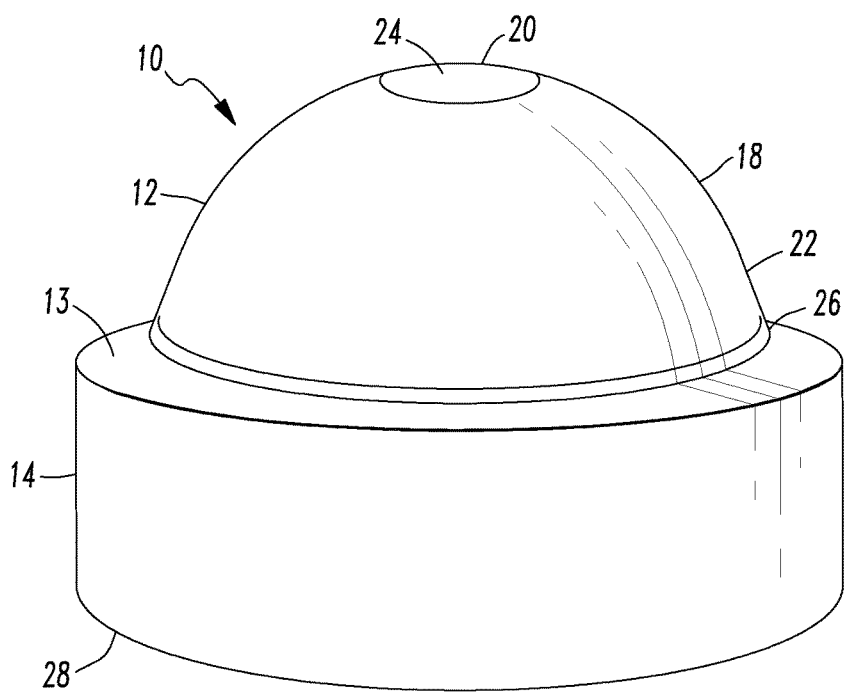
FIG. 1 is a perspective view of a simulated eye, showing the eye with a painted interior cornea surface.
Figure 2:
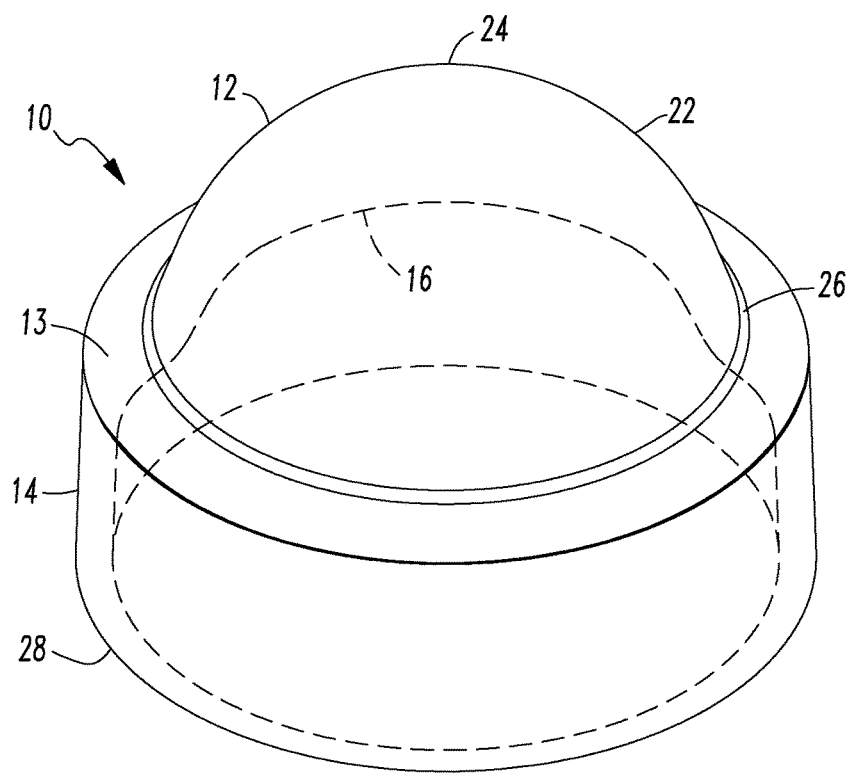
FIG. 2 is a perspective view of a simulated eye, showing the eye prior to painting of the interior cornea surface.
Figure 3:
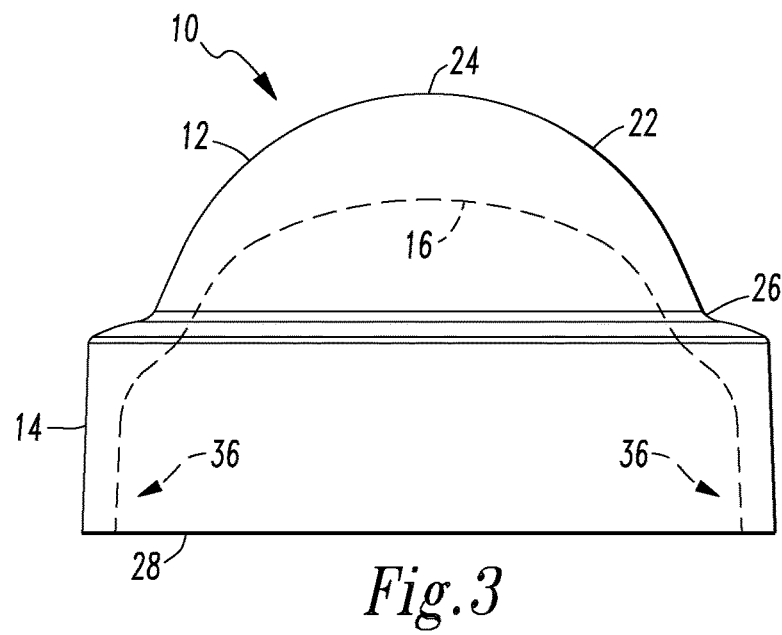
FIG. 3 is a side elevational view of a simulated eye.
Figure 4:
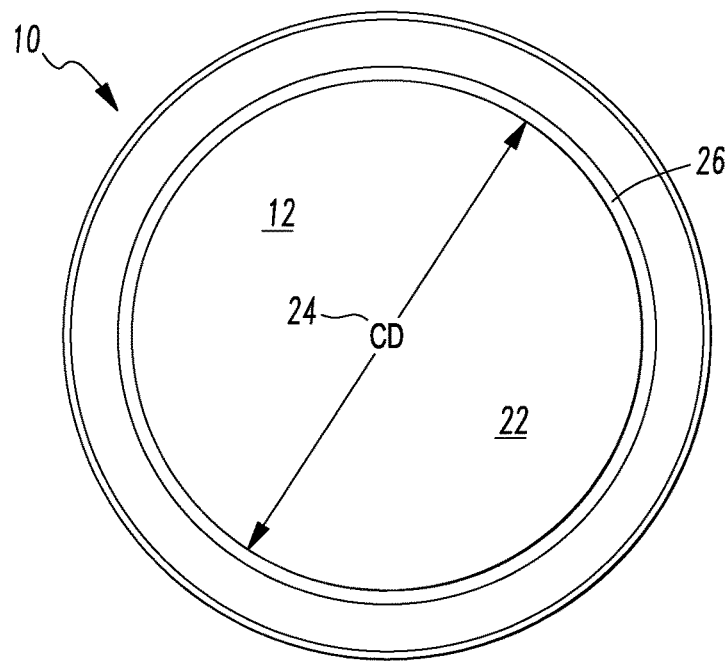
FIG. 4 is a top plan view of a simulated eye.
Figure 5:
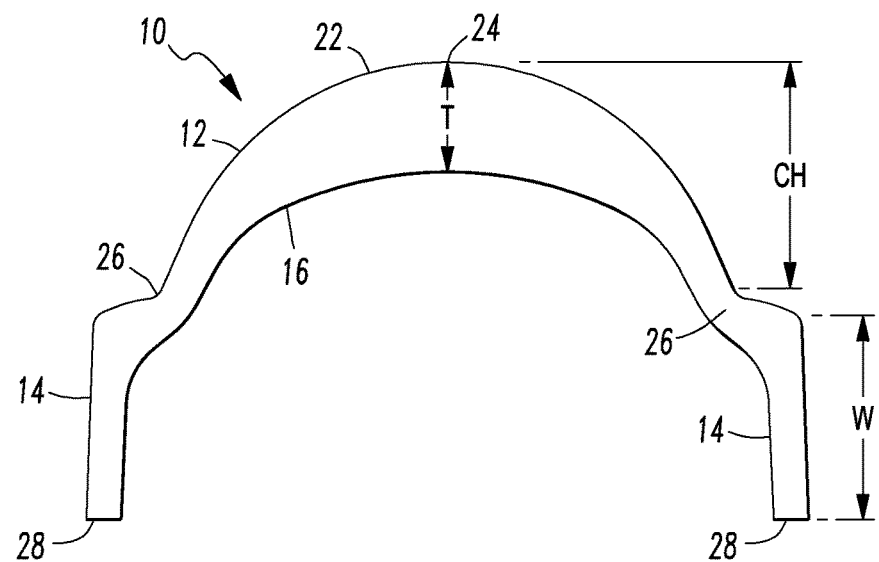
FIG. 5 is a cross sectional view of a simulated eye, taken along the lines 5-5 in FIG. 4.

Referring to the drawings, a simulated eye is illustrated. As illustrated in FIG. 1, the simulated eye 10 includes a cornea portion 12, a scleral band 13, and a positioning band 14. The cornea portion 12 includes a concave interior surface 16 (FIGS. 3 and 5) that can be painted to resemble an iris 18 and pupil 20 of the taxidermy animal, or the animal or human to be modeled. Although the illustrated example of the pupil 20 is round, other shapes may be used without departing from the scope of the invention, for example, the elliptical pupil of some species of ducks. The simulated eye 10 can be made from any suitable transparent material, such as glass or transparent polymer. Clear acrylic is a preferred material. Good results have been obtained using Plexiglas 8N, which has an index of refraction of 1.49, which is advantageously close to that of a genuine eye. The combination of the structure described below and the index of refraction of the simulated eye 10 produce the desired refractory effects as described below. Although the illustrated example is based on an index of refraction of 1.49, variations in the structure described would permit materials having other indexes of refraction to be used to achieve the claimed simulated eye 10, The cornea portion 12 is best illustrated in FIGS. 2-5. The cornea portion 12 includes a convex exterior surface 22, and a thickness T defined between the interior surface 16 and exterior surface 22. The thickness T is therefore at its thickest at the center 24 of the cornea portion 12, in the location typically occupied by the pupil 20. The thickness T decreases as the edge 26 of the cornea portion is approached. The ratio of cornea thickness around the edge of the cornea to cornea thickness at the center of the cornea may range from about 0.25 to about 0.7. More preferably, the ratio of cornea thickness around the edge of the cornea to cornea thickness at the center of the cornea may range from about 0.31 to about 0.5. This tapering thickness structure, particularly when combined with other features of the simulated eye 10 that are described herein, contribute to the desired refractory effects.

The strength of the eye is also preferably taken into account in deciding these dimensions and ratios. The portion of the cornea that meets the positioning band is typically about 0.7 mm thick, and could potentially vary by about 0.1 mm. Thicknesses less than about 0.7 mm will present some difficulties in removal of the eye from the mold, because they will not have sufficient strength.

The ratio of the thickness at the center of the cornea to the diameter of the cornea also contributes to the desired appearance and refractory effects of the simulated eye 10. The thickness at the center of the cornea is about 15% to about 40% of the diameter of the cornea. More preferred embodiments may have a cornea thickness of about 20% to about 33% of the diameter of the cornea, with about 20% of the diameter of the cornea being particularly preferred. This thickness may vary from about 1.4 mm to about 2.2 mm, for cornea/iris diameters of about 7 mm to about 11 mm. Given these dimensions, and the configurations shown in the drawings, pressures of at least up to 50 pounds can be withstood by the simulated eye 10.

Additionally, the relationship between the height CH of the cornea portion and the diameter CD of the cornea portion contribute to the desired appearance. Examples of the ratio of the height CH to the diameter CD range from about 0.4 to about 0.42. In the illustrated example, the ratio of the height CH to the diameter CD is about 0.409. This ratio, particularly when combined with the thickness ratios described above, contributes to the desired refractory effects and appearance of the eye.

Example embodiments of the eye may be offered in 7 mm, 8 mm, 9 mm, 10 mm, and 11 mm iris diameters, without excluding the possibility of other diameters. With diameters significantly above 11 mm, the thickness of the cornea is increased not only in an absolute sense, but also relative to the iris diameter. For example, while a central cornea thickness of about 20% of the iris diameter is desirable with the above example sizes, larger sizes may have central cornea thicknesses approaching 33% of the iris diameter.

The positioning band 14 is generally cylindrical, having a substantially uniform width. In some examples, the width W of the scleral band is about the same as the height CH of the cornea. The edge 28 of the positioning band opposite the cornea defines a substantially planar surface. The intersection of the cornea portion 12 and positioning band 14 forms the scleral band 13, contributing to the lifelike appearance of the simulated eye 10. The positioning band not only provides a more lifelike appearance, but also provides a point of reference to properly set the simulated eye 10 into the eye orbit. Setting a traditional hemisphere simulated eye in place often requires about 15 minutes to complete satisfactorily. The inclusion of a positioning band reduces the time to about 30 seconds. The simulated eye 10 therefore not only provides unprecedented lifelike appearance, but also unprecedented simplicity of installation for the taxidermist.

Because refraction of light passing through the simulated eye 10 is critical for its realistic appearance, care must be taken not only with the dimensions, curvatures, and dimensional ratios, but also with the manner in which the various curves join each other. If adjoining curves are not carefully blended, the intersection of adjoining curves will appear as a line, which in some instances may not resemble a line that would be present in a genuine eye. Many curvatures within the simulated eye 10 are therefore structured so that their intersections form either G2 or G3 curves. To provide some background, different types of curvature are described on the website http://cadjunkie.com/1113/continuity-101, the contents of which are expressly incorporated herein by reference. As described by that website, the G stands for geometric continuity. The number following the G is the degree of continuity.

As the degree of continuity increases, the number of requirements of a curvature so defined increase. G0 continuity is nothing more than a point where two curves meet. G1 continuity adds the requirement that the curves go the same direction at the intersection point. G2 continuity adds the further requirement that the curves have the same radius at the intersection point. G3 continuity adds the requirement that the radius of curvature of each curve is changing at the same rate at the intersection point. G4 curvature adds the requirement that the rate of change in curvature for the intersecting curves is the same in three dimensions.

Applying these principles to the simulated eye 10, it has been found that, in certain locations within the simulated eye 10, G0 or G1 continuity results in the appearance of lines which detract from the realistic appearance of the simulated eye 10. Therefore, throughout most of the interior surface 16, with the exception of the lower portion 36 of the positioning band 14, intersections between curves have been designed to form either G2 or G3 continuity. Additionally, the curves within the exterior surface of the cornea portion 12 and scleral band 13 are also designed so that the intersections between these curves form either G2 or G3 curves. This type of curved structure resists the appearance of undesired lines when viewing the simulated eye 10, increasing the realistic nature of the appearance of the simulated eye 10.

The interior of the eyes are painted to resemble the iris and pupil of a real eye. The exterior surface of the cornea is polished to a sufficiently smooth finish to produce a shiny, reflective surface. An example of a preferred grade of surface finishing is an A1 finish. Other areas of the simulated eye 10 are provided with a generally smooth, but still somewhat roughened, surface finish. An example of such a grade of surface finish is an A2 surface finish. The smooth exterior surface provides good optical qualities to the cornea. The relatively (as compared to the cornea) roughened interior surface provides good adhesion of the paint to the interior surface. The relatively (as compared to the cornea) roughened scleral or positioning band surface provides a level of reflectivity which is similar to the reflectivity of this portion of a genuine eye, adding to the realistic appearance of the simulated eye 10.

If the simulated eye 10 is being used for taxidermy, the procedure for installing the simulated eye is well known to taxidermists, and will therefore be described only briefly herein. Typically, a taxidermist will utilize a urethane representation of a head for the animal being prepared. When used with the simulated eye 10, the urethane head is provided with a pair of apertures for mounting the simulated eye 10. The positioning band 14 of a simulated eye 10 is mounted in each aperture, utilizing clay to aid in securing a simulated eye 10 within each aperture. The use of the aperture, along with the positioning band 14, greatly simplifies the process of mounting the simulated eye 10, as well as increasing the precision with which the simulated eye 10 is located. Additionally, this structure enhances the visibility and realistic appearance of the scleral band 13. The animal's skin is then pulled over the urethane head.

To understand how all of the above described features work together to produce the desired visual effects, we consider Snell's law, which defines the change in the angle at which light travels as it passes from one medium to another having a different index of refraction. According to Snell's law, $N_i*\sin(A_i)=N_r*\sin(A_r)$, where $N_i$ is the index of refraction of the material the light is leaving, $A_i$ is the incident angle from perpendicular to the interface between the two mediums, $N_r$ is the index of refraction of the material the light is entering, and $A_r$ is the refractive angle from perpendicular to the interface between the two mediums. Accordingly, light passing from a material having a lower index of refraction to a material having a higher index of refraction will refract closer to perpendicular. Similarly, light passing from a material having a higher index of refraction to a material having a lower index of refraction will refract away from perpendicular.

Figure 6:
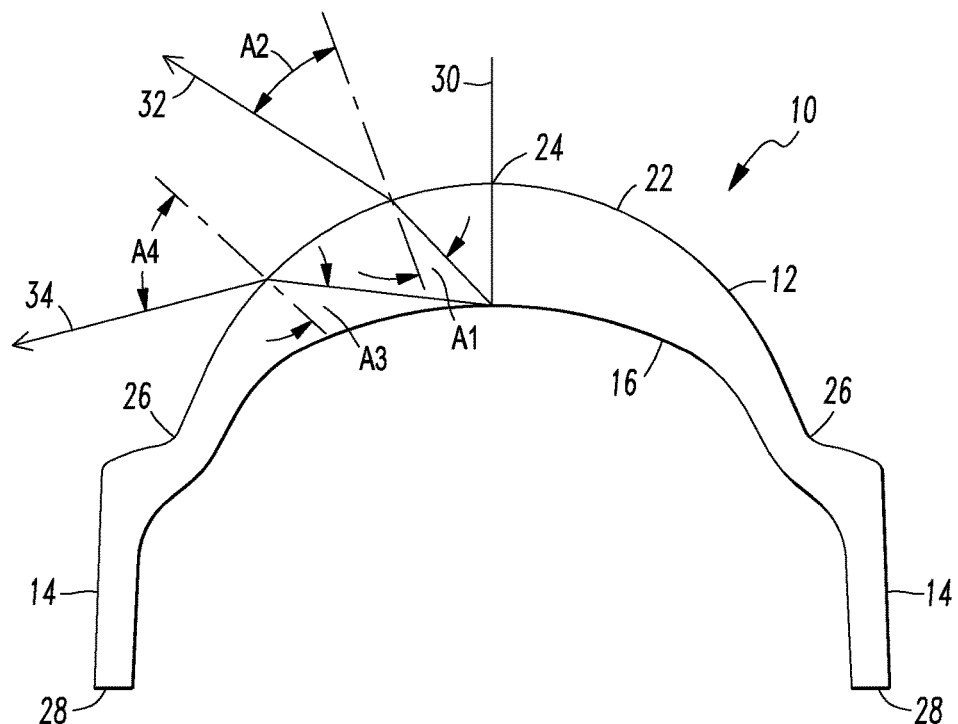
FIG. 6 is a cross sectional view of a simulated eye, taken along the lines 5-5 in FIG. 4.

Applying these principles to the simulated eye 10, air has an index of refraction of 1.0002926, and the illustrated example of a simulated eye 10 has an index of refraction of 1.49. Therefore, light entering the simulated eye 10 will refract closer to perpendicular, and light exiting the simulated eye 10 will refract farther from normal. Referring to FIG. 6, a viewer looking directly at the center 24 of the cornea 12 will see light 30 being reflected off of the paint on the interior surface 16, passing back through the cornea 12, substantially perpendicular to the exterior surface 22. Although passing out of the exterior surface 22 into air will tend to refract the light away from perpendicular, light travelling perpendicular to the surface 22 will not be refracted, since both sides of the Snell's law equation will equal zero. A viewer looking at the cornea 12 in a position to see light 32 being reflected off of the pupil 20 portion of the paint on the interior surface 16 will see that light refracted. Specifically, the light 32 passes through the exterior surface 22 at an angle A1, which in the illustrated example is about 25° from perpendicular. Applying Snell's law, the light 32 will be refracted to the angle A2, which in the illustrated example is about 39° from perpendicular. The pupil will therefore appear to move towards the viewer. Similarly, a viewer looking at the cornea 12 in a position to see light 34 being reflected off of the pupil 20 portion of the paint on the interior surface 16 will see that light refracted to a greater extent. Specifically, the light 34 passes through the exterior surface 22 at an angle A3, which in the illustrated example is about 34° from perpendicular. Applying Snell's law, the light 34 will be refracted to the angle A4, which in the illustrated example is about 56° from perpendicular. The pupil will therefore appear to move towards the viewer to an even greater extent. Therefore, as the viewer moves from viewing the center 24 of the cornea 12 to the edge 26 of the cornea 12, the pupil will appear to move towards the viewer in a manner that simulates a genuine eye.

The present invention therefore provides a simulated eye that is easy to manufacture, and that is easy to install in a simulated animal, simulated human, toy, etc. The invention further provides a simulated eye with a realistic, lifelike appearance. As the eye is viewed from different angles, the refractory effects on the appearance of the iris and cornea mimic those of a genuine eye.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A simulated eye, comprising a transparent, one-piece structure, made from a material having an index of refraction of about 1.49, forming a cornea portion, a positioning band, and a scleral band connecting the cornea portion and positioning band, the cornea portion having a convex external surface, an internal surface, and a thickness defined therebetween, the cornea portion further defining a central section corresponding to a front of the simulated eye and an edge corresponding to a side of the simulated eye, the thickness being greatest within the central section and tapering towards the edge, the internal surface of the cornea portion having coloring thereon to resemble an iris and pupil, the cornea portion's thickness around its edge and the thickness of the central section having a ratio of about 0.25 to about 0.7, the cornea portion having a maximum thickness of about 20% to about 33% of an external diameter of the cornea portion; whereby a viewer viewing a portion of the simulated eye will view the pupil appearing to be oriented generally towards the viewer regardless of whether the viewer views the simulated eye from the front, the side, or from a position between the front and side.

2. The simulated eye according to claim 1, wherein the positioning band is generally cylindrical, and includes a mounting edge that lies substantially within the same plane.

3. The simulated eye according to claim 1, wherein the ratio of the cornea portion's thickness around its edge to the thickness of the central section is about 0.31 to about 0.5.

4. The simulated eye according to claim 1, wherein each internal surface of the cornea portion, scleral band, and adjoining portion of the positioning band, as well as the external surface of the cornea portion, are curved surfaces, the simulated eye further defining a plurality of intersections between said curved surfaces, each intersection between said curved surfaces being either a G12 curve or a G3 curve.

5. The simulated eye according to claim 4, wherein the ratio of the cornea portion's thickness around its edge to the thickness of the central section is about 0.31 to about 0.5.

6. The simulated eye according to claim 1, wherein the external surface of the cornea portion is polished to an A1 surface finish, and all other surfaces are polished to an A2 surface finish.

7. The simulated eye according to claim 1, wherein the cornea portion forms a positive meniscus lens.

* * * * *